United States Patent
Iba et al.

(10) Patent No.: US 7,830,625 B2
(45) Date of Patent: Nov. 9, 2010

(54) LENS POSITIONING JIG, METHOD OF ATTACHING LENS BARREL AND LENS DEVICE

(75) Inventors: Sayaka Iba, Saitama (JP); Hitoshi Shimizu, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 94 days.

(21) Appl. No.: 12/116,098

(22) Filed: May 6, 2008

(65) Prior Publication Data

US 2009/0027783 A1    Jan. 29, 2009

(30) Foreign Application Priority Data

May 8, 2007    (JP) .......................... P2007-123671

(51) Int. Cl.
G02B 7/02    (2006.01)
(52) U.S. Cl. ...................................... 359/819; 359/811
(58) Field of Classification Search ................ 359/815, 359/818–819, 822, 827, 700, 823; 396/529, 396/535; 348/E5.028
See application file for complete search history.

(56) References Cited

U.S. PATENT DOCUMENTS

| | | | | |
|---|---|---|---|---|
| 4,033,683 A | * | 7/1977 | Tancredi | 353/7 |
| 6,811,285 B2 | * | 11/2004 | Ferguson et al. | 362/267 |
| 2003/0137753 A1 | * | 7/2003 | Takase | 359/811 |
| 2004/0167469 A1 | * | 8/2004 | Nemoto | 604/131 |
| 2004/0189862 A1 | * | 9/2004 | Gustavsson et al. | 348/376 |
| 2005/0275759 A1 | | 12/2005 | Itohiya | |
| 2008/0152339 A1 | * | 6/2008 | Westerweck et al. | 396/541 |

FOREIGN PATENT DOCUMENTS

JP    2005-352293 A    12/2005
JP    2001-100071 A    4/2007

* cited by examiner

Primary Examiner—Jessica T Stultz
Assistant Examiner—Mahidere S Sahle
(74) Attorney, Agent, or Firm—Birch, Stewart, Kolasch & Birch, LLP

(57) ABSTRACT

It is provided that a lens positioning jig, a method of attaching lens barrel, and a lens device. A lens holding portion is inserted through a barrel insertion hole, and then a housing holding portion allows a barrel attachment portion to be thereby positioned and held in a lens housing. When an air pump is operated, a lens holding portion sucks and holds a convergent lens held in a second lens barrel and then positioned with respect to the barrel attachment portion. In addition, the second lens barrel is held in the lens housing so that the second flange does not come in contact with barrel attachment groove. Subsequently, an adhesive is filled into a gap formed between the second flange and the barrel attachment groove to thereby fix the second lens barrel thereto.

3 Claims, 6 Drawing Sheets

LENS POSITIONING JIG, METHOD OF ATTACHING LENS BARREL AND LENS DEVICE

CROSS-REFERENCE TO RELATED APPLICATIONS

This application is based on and claims priority under 35 USC 119 from Japanese Patent Application No. 2007-123671 filed May 8, 2007.

BACKGROUND

1. Technical Field

The present invention relates to a lens positioning jig which is used for attaching a lens barrel to a housing, a method of attaching a lens barrel using the lens positioning jig, and a lens device in which the lens barrel is attached to the housing in accordance with the lens positioning jig and the method of attaching the lens barrel.

2. Related Art

As a large-screen monitor, a rear projection device is known. The rear projection device includes a screen which is mounted to a housing, a plane mirror which is mounted to a position in rear of the screen, and an optical engine which projects image light to the plane mirror. The optical engine includes an illumination optical system which generates uniform illumination light from a high brightness light source, a color separating/synthesizing optical system which separates the illumination light into three colors and then synthesizes the resultant after granting image information thereto using an image display element, and a projection lens unit which enlarges and projects the image light, which is formed in this way, to the plane mirror.

The projection lens unit includes a convergent optical system which converges the image light being incident from the color separating/synthesizing optical system, a mirror which reflects the image light converged by the convergent optical system, a projection optical system which enlarges the image light reflected by the mirror and which projects the image light to a plane mirror, and a lens housing in which they are incorporated (for example, see Patent Documents 1 (JP-A-2005-352293 corresponding to US-A-2005-275759)).

The convergent optical system is configured such that a plurality of convergent lenses are mounted inside the lens barrel, the lens barrel being attached to a barrel attachment portion disposed in one end of the lens housing. Additionally, in order to converge appropriately the image light which is incident to the mirror without a change, a part of the lens constituting the convergent optical system may be mounted to a second lens barrel and the second lens barrel may be disposed between the mirror and a first lens barrel which is attached to one end of the lens housing.

In such a convergent optical system, when a gap occurs between optical axes of the first lens barrel and the second lens barrel, image quality deteriorates. For this reason, the known projection lens unit improves forming precision of an attachment portion to be attached with the second lens barrel with respect to the barrel attachment portion to be attached with the first lens barrel and then aligns the optical axis center to be the same when the second lens barrel is attached to the attachment portion. Alternatively, for example, like a lens device disclosed in Patent Document 2 (JP-A-2001-100071), the lens barrel comes into contact with a plurality of set screws and then the optical axis is adjusted by fastening or unfastening the respective screws.

However, when the lens housing and the second lens barrel are formed of plastic, a problem may arise in that it is not possible to obtain sufficient precision. Although additional machining processes may be carried out after the forming process, a problem may arise in that a cost increases.

In addition, when the optical axis is adjusted through the set screw, a problem may arise in that a deformation may occur in the lens or the barrel to thereby deteriorate image quality. Further, a problem may arise in that repeatability of a plurality of products is low and it takes time for adjusting the optical axis one time, thereby requiring an experienced skill to some degree.

The present invention solves the above-described problems, and an object of the invention is to provide a lens positioning jig, a method of attaching a lens barrel, and a lens device which can fix a lens barrel with high precision without forming a barrel attachment portion of a lens housing with high precision.

SUMMARY

[1] According to an aspect of the invention, a lens positioning jig for allowing a second lens barrel to be positioned in a housing including a barrel insertion portion into which a first lens barrel is inserted; a barrel attachment portion to which a first flange provided in an outer circumference of the first lens barrel is attached; and a barrel attachment groove which allows a second flange provided in an outer circumference of the second lens barrel to be inserted in a direction perpendicular to an optical axis of the first lens barrel and allows the second lens barrel to be held on the optical axis of the first lens barrel, the lens positioning jig includes a housing holding portion and a lens holding portion. The housing holding portion holds the housing by positioning the barrel attachment portion. The lens holding portion is inserted through the barrel insertion portion when the housing is held by the housing holding portion. The lens holding portion sucks and holds a lens of the second lens barrel so that (i) the lens of the second lens barrel has a given position and angle with respect to the barrel attachment portion and (ii) the second flange dose not come in contact with the barrel attachment groove.

[2] According to another aspect of the invention, a method of attaching a lens barrel using a lens positioning jig for allowing a second lens barrel to be positioned in a housing including a barrel insertion portion into which a first lens barrel is inserted; a barrel attachment portion to which a first flange provided in an outer circumference of the first lens barrel is attached; and a barrel attachment groove which allows a second flange provided in an outer circumference of the second lens barrel to be inserted in a direction perpendicular to an optical axis of the first lens barrel and allows the second lens barrel to be held on the optical axis of the first lens barrel, the method includes holding the housing in which the second lens barrel is inserted into the barrel attachment groove by positioning the barrel attachment portion and the first flange; sucking and holding a lens of the second lens barrel at a given position and angle with respect to the barrel attachment portion so as not to allow the second flange to come in contact with the barrel attachment groove; filling an adhesive into a gap between the second lens barrel and the barrel attachment groove; and solidifying the adhesive.

[3] According to another aspect of the invention, a lens device includes a lens barrel, a housing. The lens barrel has a flange provided in an outer circumference thereof. The housing includes a barrel attachment groove which is larger in width than the flange and into which the flange is inserted in a direction perpendicular to an optical axis. The lens barrel is fixed by an adhesive filled between the flange and the barrel attachment groove in a state that the flange does not come in contact with the barrel attachment groove.

According to the lens positioning jig of [1], since the housing is held by the housing holding portion and the lens is positioned with respect to the barrel attachment portion with high precision just by allowing the lens of the second lens barrel to be sucked and held by the lens holding portion, it is possible for even an inexperienced operator to simply complete the positioning operation in a short time. In addition, since repeatability of positioning precision of the lens is improved by employing the lens positioning jig, it is possible to obtain high optical performance.

Further, according to the method of attaching the lens barrel of [2] and the lens device of [3], since the second flange is fixed to the barrel attachment groove by use of an adhesive in a state that the second flange does not come in contact with the barrel attachment groove, it is not necessary to provide the highly-precise barrel holding portion which allows the lens barrel to be positioned in the housing. Accordingly, it is possible to reduce the number of manufacture processes of the housing and to reduce a manufacture cost.

DETAILED DESCRIPTION

Figure 1:
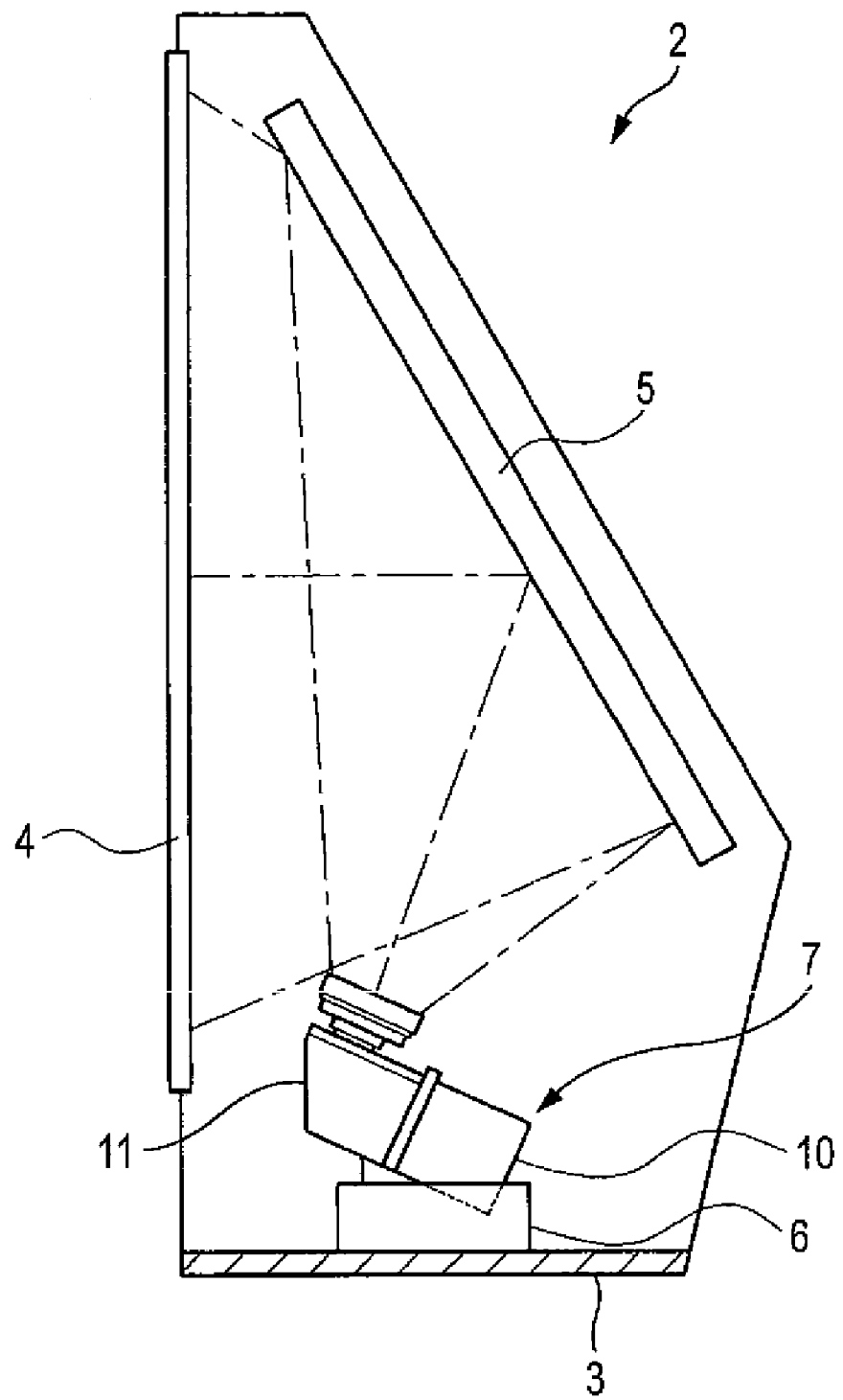
FIG. 1 is a schematic view illustrating an example of a rear projection device.

In FIG. 1, a rear projection device 2 includes a screen 4 which is disposed in a front surface of a housing 3, a plane mirror 5 which is disposed in rear of the screen 4, and an optical engine 7 which is fixed to a bottom portion of the housing 3 through a fixing portion 6. The plane mirror 5 is disposed so that a slope angle with respect to the screen 4 becomes small in order to make the inner depth of the rear projection device 2 small.

The optical engine 7 is configured such that an image forming unit 10 which generates image light is connected to a projection lens unit 11 which projects the image light. The optical engine 7 is mounted so that an optical axis of image light projected from the projection lens unit 11 is slanted with respect to the screen 4, and the image light is reflected by the plane mirror 5 to thereby project an image to the screen 4. Here, although the image is projected to the screen 4 in the manner that the left and right are reversed, the image is displayed in proper order when viewed from the front side.

The image forming unit 10 includes, for example, a light source, an illumination optical system, a color separating/synthesizing optical system, and the like. As the light source, a high-intensity light source such as a metal halide lamp, a super high pressure hydrargyrum lamp, or a xenon lamp is used in accordance with its application. The illumination optical system includes a fly-eye lens, a polarization conversion element, a condenser lens, and the like, and then generates uniform illumination light from light radiated from the light source. The color separating/synthesizing optical system includes, for example, a dichroic mirror, a polarization prism, a dichroic prism, a synthesis prism, an LCD panel, and the like. Then, the color separating/synthesizing optical system separates the uniform illumination light into color light of red, blue, and green and generates image light of each color using the LCD panel. Subsequently, the color separating/synthesizing optical system synthesizes the image light of each color again.

Figure 2:
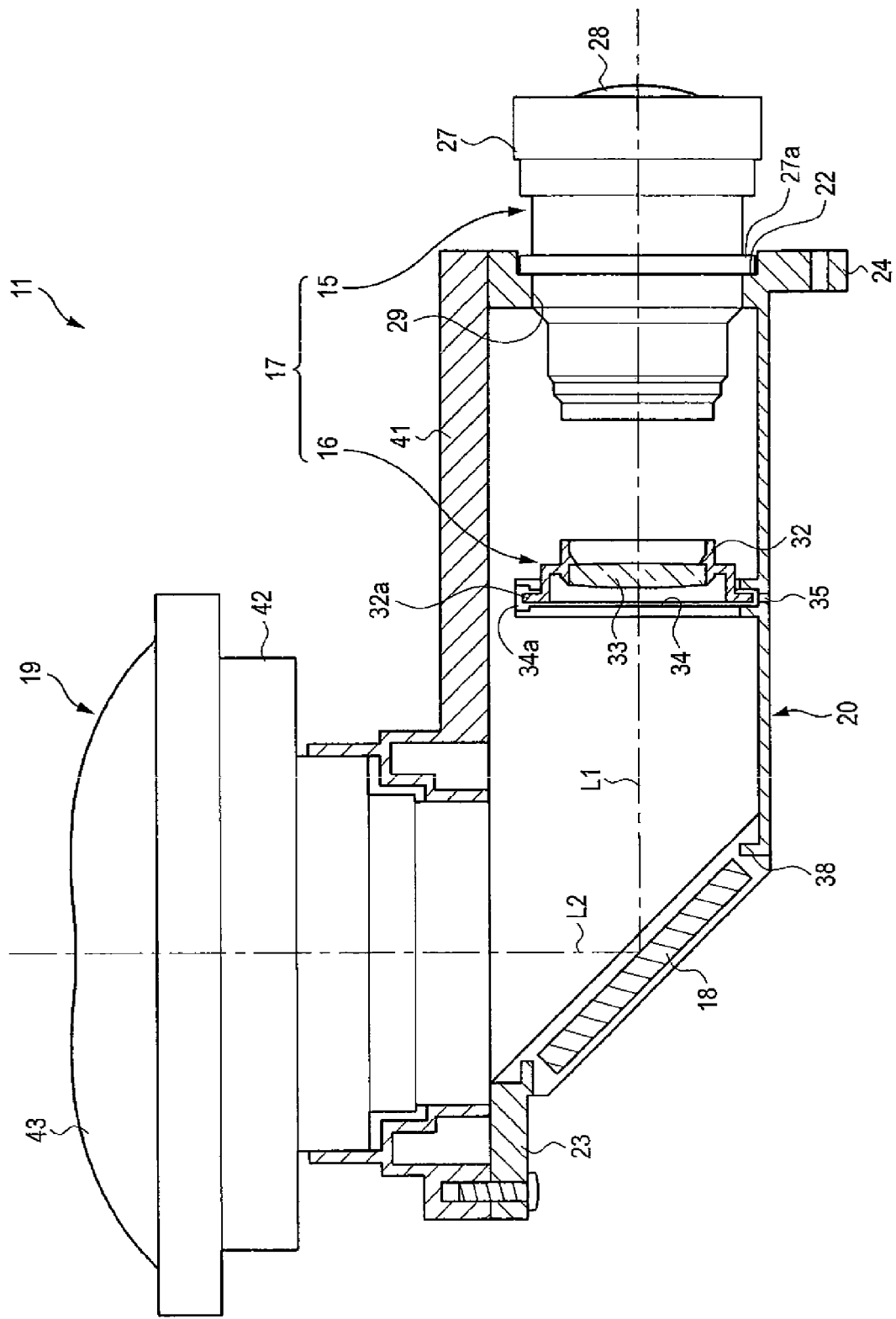
FIG. 2 is a sectional view illustrating a configuration of a projection lens unit.
Figure 3:
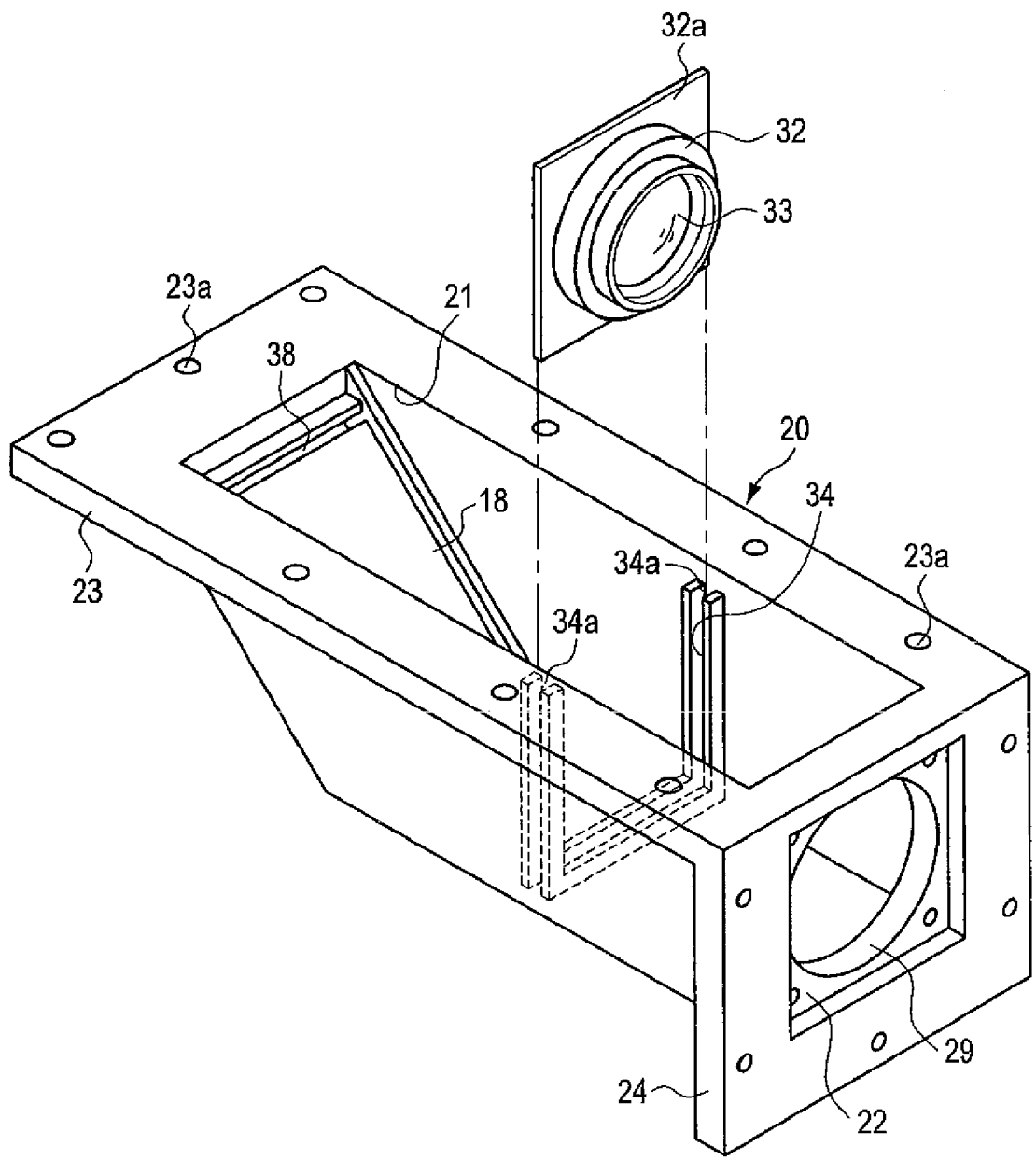
FIG. 3 is a perspective view illustrating an external shape of lens housing.

As shown in FIG. 2, the projection lens unit 11 includes a convergent optical system 17 having a first optical system 15 and a second optical system 16, a mirror 18, a projection optical system 19, and a lens housing 20 which holds them therein. As shown in FIG. 3, the lens housing 20 is substantially formed into a box shape by a plastic having a light blocking effect so that a rectangular opening 21 is formed in the upper surface. Then, the lens housing 20 includes a barrel attachment portion 22 to which the first optical system 15 is attached, a projection flange 23 to which the projection optical system 19 is attached, and a connection flange 24 which is used to be connected to the image forming unit 10.

The convergent optical system 17 converges the image light which is incident from the image forming unit 10 and then emits the image light to the mirror 18 along an optical axis L1. The first optical system 15 constituting the convergent optical system 17 includes a first lens barrel 27 and a convergent lens 28 which is held in the first lens barrel 27. The first optical system 15 is configured such that the first lens barrel 27 is inserted into a barrel insertion hole 29 formed in one end of the lens housing 20 and then a rectangular first flange 27a formed in the outer circumference of the first lens barrel 27 is inserted into a barrel attachment portion 22 with a rectangular and concave shape to be fixed thereto by a screw or the like.

The second optical system 16 includes a second lens barrel 32 and a convergent lens 33 which is held in the second lens barrel 32. The second lens barrel 32 is configured such that a second flange 32a formed in the outer circumference thereof is inserted into barrel attachment groove 34 which is formed between two protrusions in the inner wall surface of the lens housing 20. The barrel attachment groove 34 has an external shape and a depth which are larger than those of the second flange 32a. The second lens barrel 32 is fixed to the lens housing 20 by filling a boding agent into insertion holes 34a of the barrel attachment groove 34 and a filling hole 35 formed through the lens housing 20 in the state where the second flange 32a does not come in contact with the barrel attachment groove 34.

The mirror 18 is slanted at 45 degree with respect to the optical axis L1 and the optical axis L2 so as to reflect the image light which is incident from the convergent optical system 17 to the projection optical system 19 along the optical axis L2. The mirror 18 is held in a mirror opening 38 which is formed in the lens housing 20 and which has an external shape larger than that of the mirror 18 so as not to come in contact with the mirror opening 38. Then, the mirror 18 is fixed thereto by an adhesive filled in a gap formed between the mirror opening 38 and the outer periphery of the mirror 18.

The projection optical system 19 includes a substrate 41 which is screw-fixed to a plurality of attachment holes 23a formed in the projection flange 23, a projection lens barrel 42 which is attached to the substrate 41, and a projection lens 43 which is held in the projection lens barrel 42. The projection optical system 19 enlarges the image light which is incident along the optic axis L2 and then projects the image light to the plane mirror 5.

Next, a lens positioning jig which is used when fixing the second lens barrel 32 to the lens housing 20 will be described. A lens positioning jig 46 shown in FIG. 4 includes a base portion 47 which is disposed on a working table, a rectangular housing holding portion 48 which is disposed on the base portion 47, a cylindrical lens holding portion 49 which is disposed on the housing holding portion 48, and an air pump 50 which sucks the convergent lens 33 with the lens holding portion 49 interposed therebetween.

Figure 5:
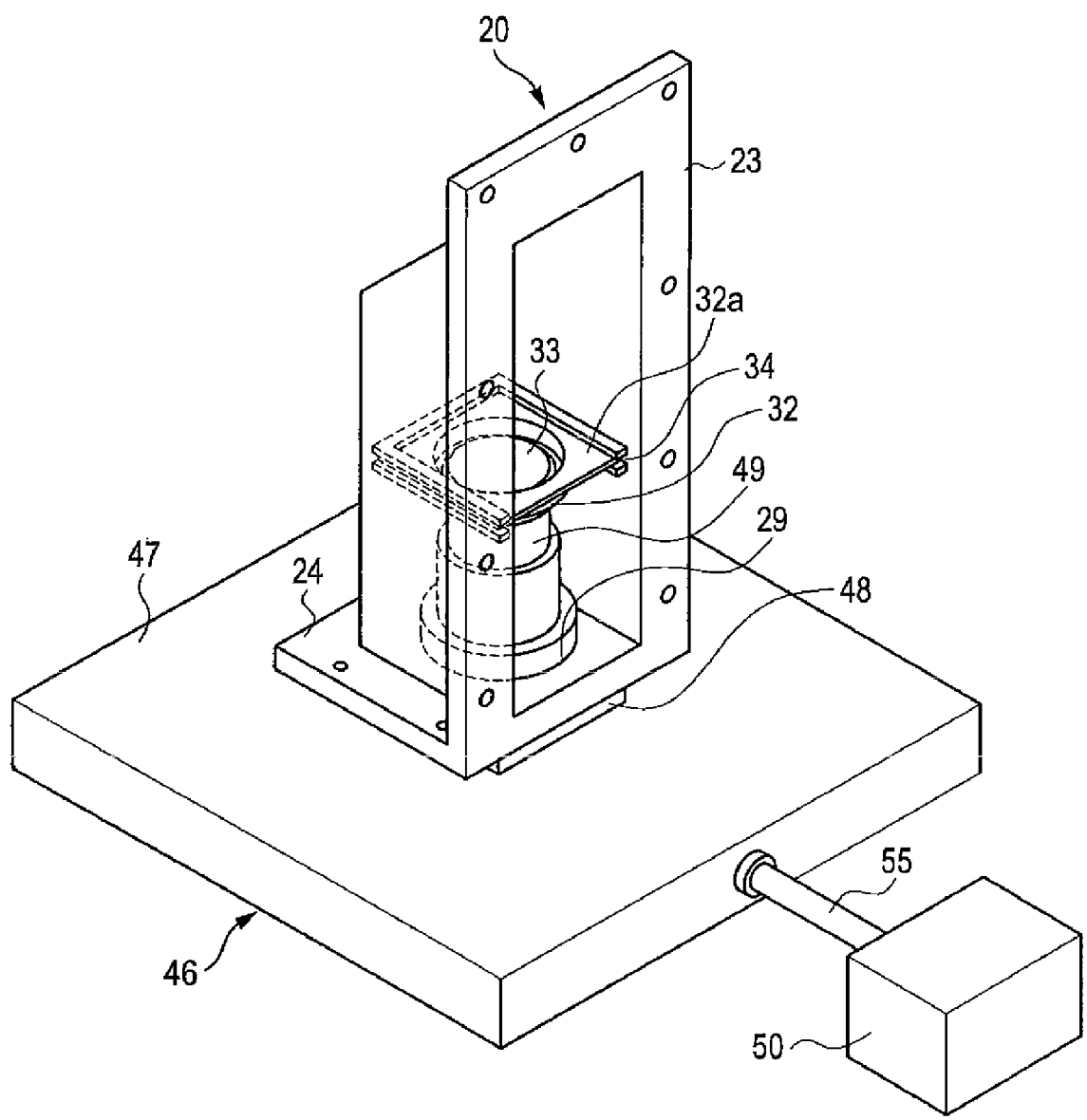
FIG. 5 is a perspective view illustrating a state where the lens housing is held by the lens positioning jig.
Figure 6:
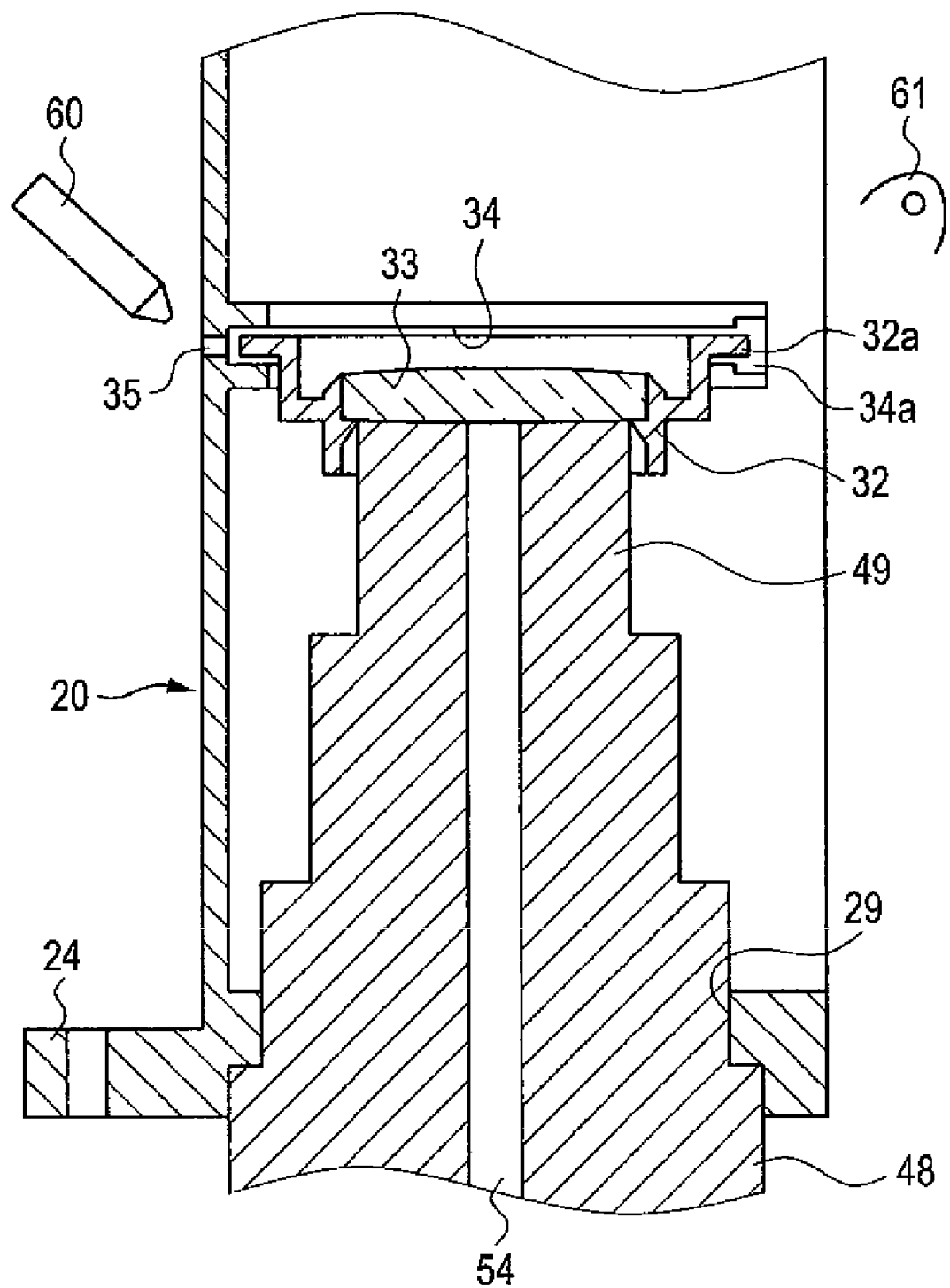
FIG. 6 is a sectional view illustrating a state when attaching a second lens barrel.

The housing holding portion 48 is formed into a rectangular block shape which can be fitted to the barrel attachment portion 22. As shown in FIGS. 5 and 6, when the lens housing 20 is attached to the lens positioning jig 46, the housing holding portion 48 is fitted to the barrel attachment portion 22 and then allows the lens housing 20 to be positioned and held therein.

The lens holding portion 49 includes a holding surface 53 formed in the front end thereof so that the convergent lens 33 inserted into the second lens barrel 32 is sucked and held. Inside the lens holding portion 49, an air passage 54 which connects the holding surface 53 to a side surface of the base portion 47 is disposed. At this time, the air passage 54 is connected to the air pump 50 though a pipe 55 or the like.

The holding surface 53 holds the convergent lens 33 at a given position and angle with respect to the barrel attachment portion 22 of the lens housing 20 held by the housing holding portion 48. Also, the second flange 32a is disposed in the lens housing 20 so as not to come in contact with the barrel attachment groove 34. For this reason, the barrel attachment portion 22 is fixed to the housing holding portion 48 and the convergent lens 33 is sucked and held by the lens holding portion 49, thereby positioning the barrel attachment portion 22 and the convergent lens 33.

Figure 4:
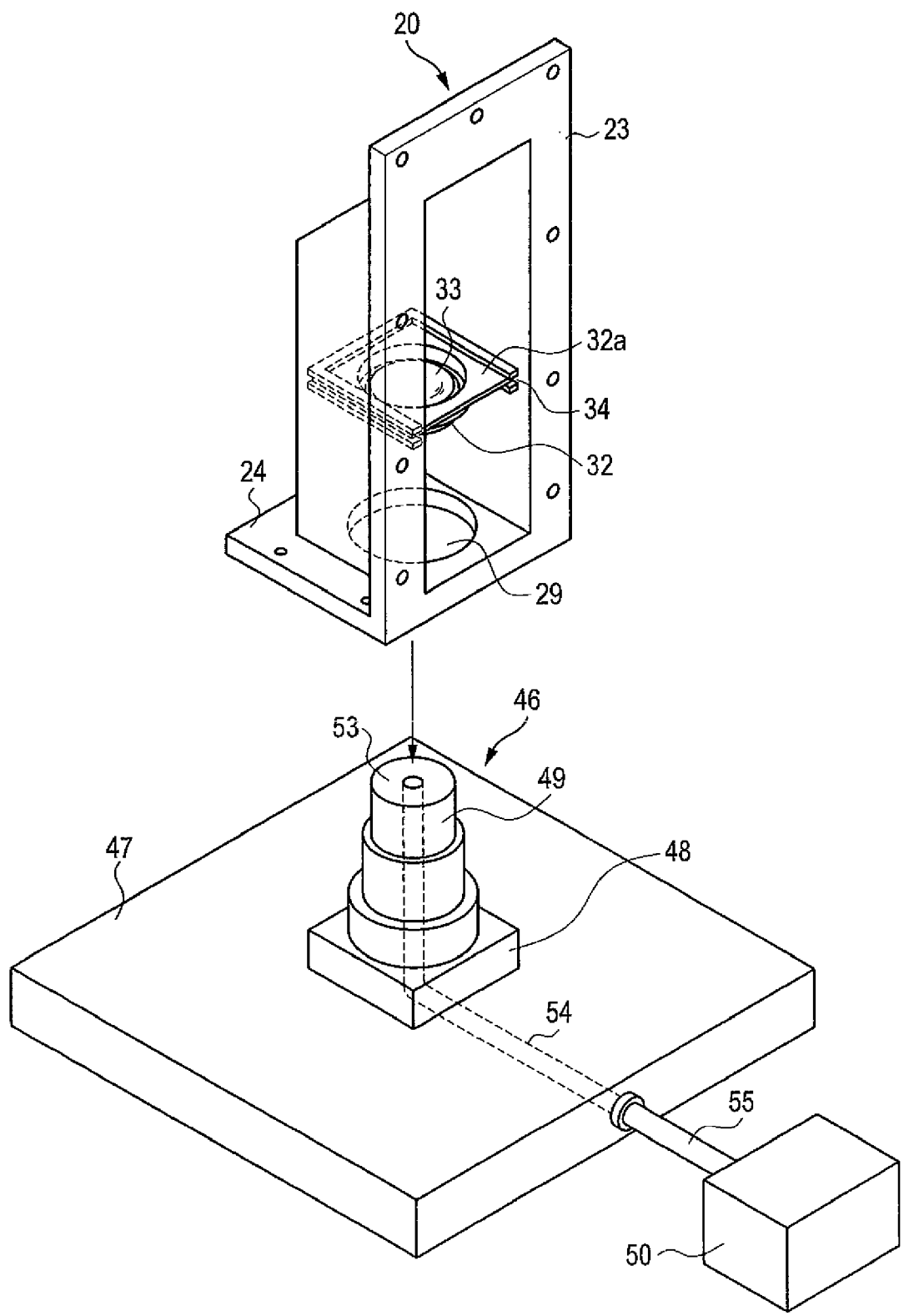
FIG. 4 is an external perspective view illustrating a configuration of a lens positioning jig.

Next, a method of attaching a second lens barrel 32 using the lens positioning jig 46 will be described. As shown in FIG. 4, the second lens barrel 32 is inserted into the barrel attachment groove 34 of the lens housing 20 to be temporarily mounted thereto, and then the barrel insertion hole 29 is inserted to the lens holding portion 49 from the upside. Accordingly, as shown in FIG. 5, the housing holding portion 48 is fitted to the barrel attachment 22 and then allows the lens housing 20 to be positioned and held therein. Additionally, the lens holding portion 49 is inserted into the second lens barrel 32 and then comes into contact with the convergent lens 33.

When the air pump 50 is operated, the convergent lens 33 is sucked and held by the holding surface 53 of the lens holding portion 49 and then positioned with respect to the barrel attachment portion 22. In addition, the second flange 32a is held in the barrel attachment groove 34 while not coming in contact with the barrel attachment groove 34.

As shown in FIG. 6, after positioning the convergent lens 33, for example, a dispenser 60 fills a UV curable adhesive into the insertion hole(s) 34a of the barrel attachment grooves 34 and the filling hole 35 and then a UV lamp 61 radiates a UV ray to the part to be solidified.

As described above, since the convergent lens 33 is completely positioned with respect to the barrel attachment portion 22 just by attaching the lens housing 20 temporarily mounted with the second lens barrel 32 to the lens positioning jig 46, it is possible for even an inexperienced operator to carry out the positioning operation with high precision in a short time without mistakes. Further, since the second flange 32a is fixed to the barrel attachment grooves 34 by an adhesive in a state that the second flange 32a does not come into contact with the barrel attachment grooves 34, it is not necessary to form the barrel attachment groove 34 with high precision. Accordingly, it is possible to reduce a cost of the projection lens unit 11.

While the preferred embodiment has been described about the exemplary projection lens unit of the rear projection device, the invention may be applied to other lens units, optical devices, and the like and also may be used for a positioning operation of optical components other than a mirror.

What is claimed is:

1. A lens positioning jig for allowing a second lens barrel to be positioned in a housing including a barrel insertion portion into which a first lens barrel is inserted; a barrel attachment portion to which a first flange provided in an outer circumference of the first lens barrel is attached; and a barrel attachment groove which allows a second flange provided in an outer circumference of the second lens barrel to be inserted in a direction perpendicular to an optical axis of the first lens barrel and allows the second lens barrel to be held on the optical axis of the first lens barrel, the lens positioning jig comprising:

a housing holding portion that holds the housing by positioning the barrel attachment portion; and a lens holding portion that is inserted through the barrel insertion portion when the housing is held by the housing holding portion, wherein the lens holding portion sucks and holds a lens of the second lens barrel so that (i) the lens of the second lens barrel has a given position and angle with respect to the barrel attachment portion and (ii) the second flange does not come in contact with the barrel attachment groove.

2. A method of attaching a lens barrel using a lens positioning jig for allowing a second lens barrel to be positioned in a housing including a barrel insertion portion into which a first lens barrel is inserted; a barrel attachment portion to which a first flange provided in an outer circumference of the first lens barrel is attached; and a barrel attachment groove which allows a second flange provided in an outer circumference of the second lens barrel to be inserted in a direction perpendicular to an optical axis of the first lens barrel and allows the second lens barrel to be held on the optical axis of the first lens barrel, the method comprising:

holding the housing in which the second lens barrel is inserted into the barrel attachment groove by positioning the barrel attachment portion and the first flange;

sucking and holding a lens of the second lens barrel at a given position and angle with respect to the barrel attachment portion so as not to allow the second flange to come in contact with the barrel attachment groove;

filling an adhesive into a gap between the second lens barrel and the barrel attachment groove; and solidifying the adhesive.

3. A lens device comprising:

a lens barrel that has a flange provided surrounding an outer circumference thereof; and a housing that includes a barrel attachment groove which is larger in width than the flange and into which the flange is inserted in a direction perpendicular to an optical axis, the barrel attachment groove configured to substantially prevent movement of the flange in the optical axis direction when the flange is inserted, wherein the lens barrel is fixed by an adhesive filled between the flange and the barrel attachment groove in a state that the flange does not come in contact with the barrel attachment groove.

* * * * *